United States Patent [19]
Ruscello

[11] Patent Number: 5,137,139
[45] Date of Patent: Aug. 11, 1992

[54] APPARATUS FOR POSITIONING PRODUCTS AT FIXED POSITIONS WHEN THESE ARE ADVANCING IN A ROW ON TOP OF A CONVEYOR BELT

[75] Inventor: Lorenzo Ruscello, Collegno, Italy
[73] Assignee: Stream S.R.L., Collegno, Italy
[21] Appl. No.: 823,582
[22] Filed: Jan. 16, 1992

Related U.S. Application Data

[63] Continuation of Ser. No. 592,614, Oct. 19, 1990, abandoned.

Foreign Application Priority Data

Oct. 13, 1989 [IT] Italy .................... 67881 A/89

[51] Int. Cl.⁵ .................................... B65G 47/26
[52] U.S. Cl. ........................... 198/460; 198/461
[58] Field of Search ............... 198/419.2, 460, 461

[56] References Cited

U.S. PATENT DOCUMENTS

| | | | |
|---|---|---|---|
| 3,251,452 | 5/1966 | Conway et al. | 198/460 |
| 3,485,339 | 12/1969 | Miller et al. | 198/460 |
| 4,355,712 | 10/1982 | Bruno | 198/460 |
| 4,369,876 | 1/1983 | Small et al. | 198/460 |
| 4,653,630 | 3/1987 | Bravin | 198/460 |
| 4,717,013 | 1/1988 | Reissmann et al. | 198/460 X |
| 5,070,995 | 12/1991 | Schaffer et al. | 198/460 |

FOREIGN PATENT DOCUMENTS 0190906 8/1986 European Pat. Off. .
2182299 5/1987 United Kingdom .

*Primary Examiner*—Joseph E. Valenza
*Assistant Examiner*—Tuan N. Nguyen
*Attorney, Agent, or Firm*—Merchant & Gould, Smith, Edell, Welter & Schmidt

[57] ABSTRACT

An apparatus for moving near each other at a preset distance products (13,14) which are advancing along conveyor belts (22,23) with pulse generators (E) applied so to measure their advancement, and at least a photocell (11) connected with a belt and able to intercept the products while advancing. The apparatus comprises first counter means for measuring the space between two successive products, connected with one of said pulse generators and a photocell (11), fixed on a first conveyor belt (22); second counter means (19) connected with respective pulse generators of said first belt (22) and with a successive belt (23) connected with a buffer storage (18) which represents the binary numerical expression of the space to be widened or reduced between two successive products and which memorizes the output signal from a pulse adder (16) of the pulse generator (E1) of said first belt (22) and said pulses are compared with a pre-established value of the desired distance; the output of said counter means (19) being connected to a motor (21) by means of a D/A converter (20), which can realize or not a variation of the speed of the upstream belt (22), according to the pulses of said second counter (19) activated by the passage of a product under said photocell; a logic control member (12) being also provided and operatively connected with said counter means (19) and said buffer storage (18).

6 Claims, 2 Drawing Sheets

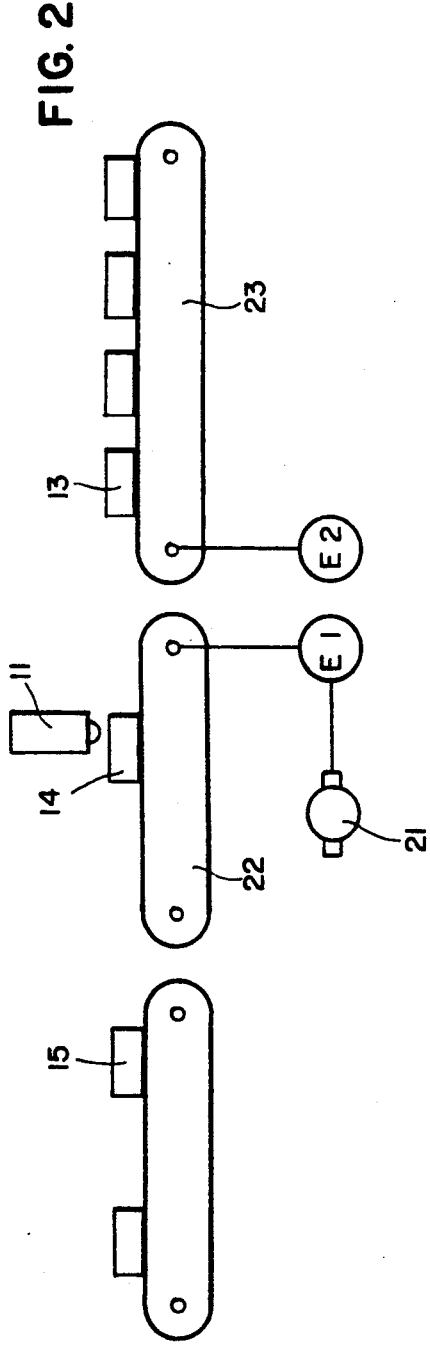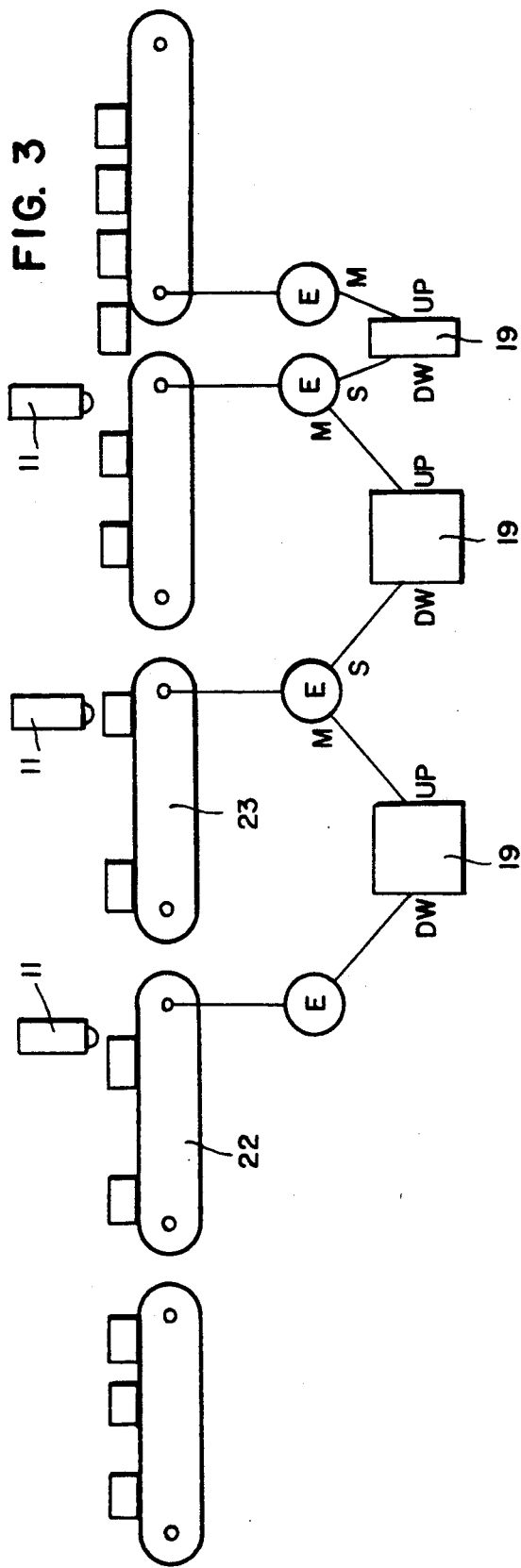

APPARATUS FOR POSITIONING PRODUCTS AT FIXED POSITIONS WHEN THESE ARE ADVANCING IN A ROW ON TOP OF A CONVEYOR BELT

This is a continuation of application Ser. No. 07/592,614, filed Oct. 4, 1990, now abandoned.

DESCRIPTION

The object of the present invention is an apparatus for positioning products at fixed positions when these are advancing in a row on top of a conveyor belt, moving them near and far from each other with a desired distance so that the products cannot push one another, avoiding therefore that they may touch each other while advancing.

Along production lines, especially foodstuffs, these advance normally with casual distances in between them. This causes some drawbacks as the products should arrive at the packer with fixed distances between them so to ensure a correct packaging and also because it is often necessary not to allow the products to contact each other to avoid interferences detrimental to them.

A purpose of the invention is to propose an apparatus able to regulate the distance between successive products keeping it in an interval within certain tolerances so to guarantee that at eventual following workstations it is possible to bring such distance, if necessary, to a very precise value very simply.

For these and other purposes that will be better understood later on, the invention proposes to realize an apparatus for moving near each other at a preset distance products which are advancing along conveyor belts with pulse generators applied so to measure their advancement, and at least a photocell connected with a belt and able to intercept the products while advancing, characterized in that it comprises first counter means for measuring the space between two successive products, connected with one of said pulse generators and a photocell, fixed on a first conveyor belt; second counter means connected with respective pulse generators of said first belt and with a successive belt connected with a buffer storage which represents the binary numerical expression of the space to be widened or reduced between two successive products and which memorizes the output signal from a pulse adder of the pulse generator of said first belt and said pulses are compared with a pre-established value of the desired distance; the output of said counter means being connected to a motor by means of a D/A converter, which can realize or not a variation of the speed of the upstream belt, according to the pulses of said second counter activated by the passage of the product under said photocell; a logic control member being also provided and operatively connected with said counter means and said buffer storage.

The apparatus according to the invention is now going to be described referring to the enclosed drawings, wherein:

FIGS. 2 and 3 are schematic views of two foodstuffs conveyors using the apparatus according to the invention.

Figure 1:
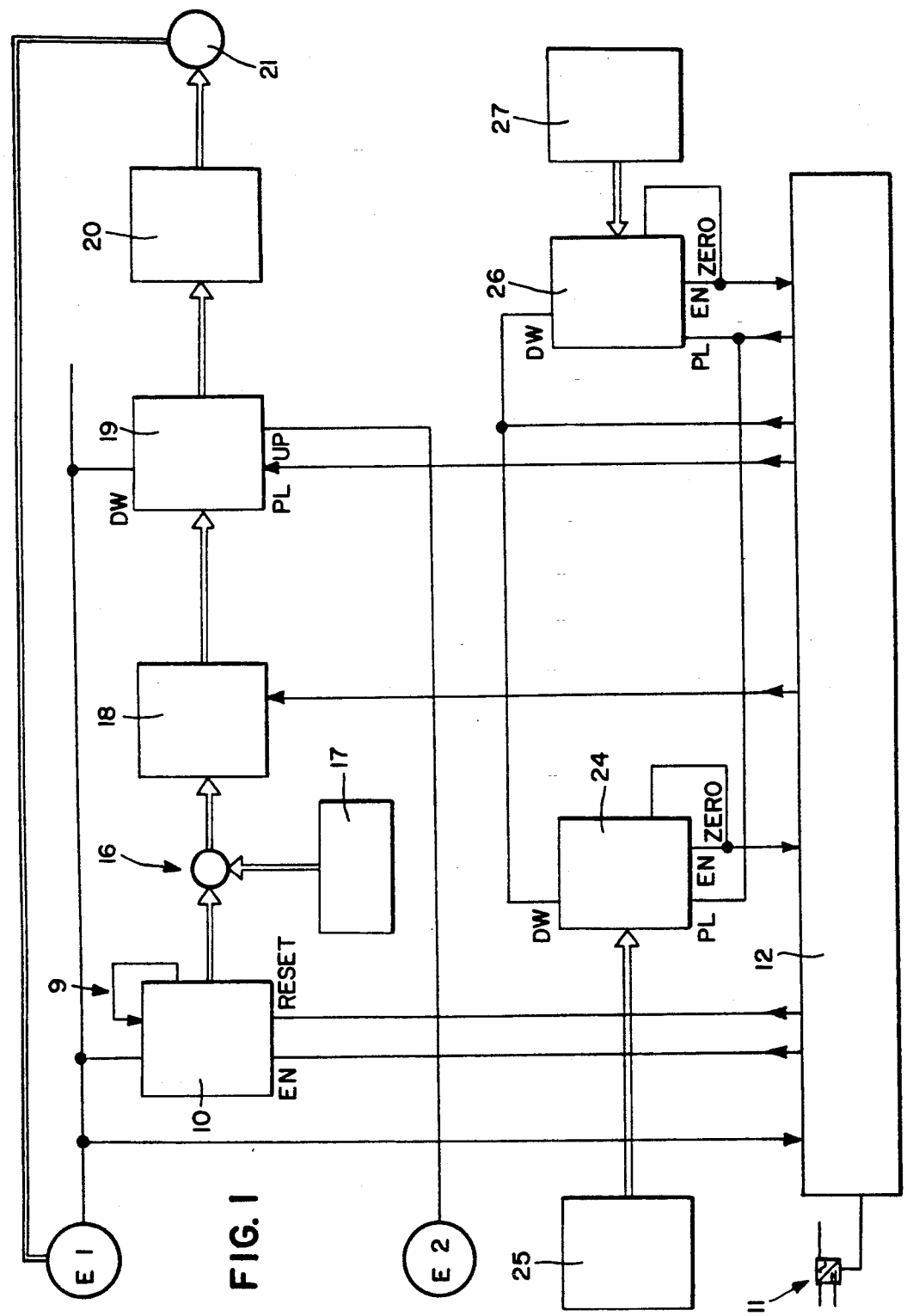
FIG. 1 is an exemplary diagram of the apparatus according to the invention.

Basically the invention employs motor driven conveyor belts with a pulse generator applied to a roll for measuring its advancement. Besides, photocells are provided mounted on the structure of at least one of the belts so to intercept the products while advancing. The pulse generator may be an encoder or a phonic wheel or any other pulse generator which matches the aims of the invention.

Referring to FIGS. 1 and 2, a counter 10 is shown which measures the empty space between a product 13 and the next one 14 by means of a photocell 11 and of an encoder E1 applied to the upstream belt 22 (FIG. 2). If the phase of light generates pulses in a greater quantity than the capacity of counter 10, this blocks itself (see ref. 9 in FIG. 1) when the maximum capacity is reached. Such counter 10 is reset by a logic control member 12 when the photocell 11 detects a new product 15 arriving. After that, by means of the signal coming from logic control member 12 the content of the same is added in 16 according to the distance set out in 17 and memorized in buffer storage 18.

A second counter 19 receives the UP and DW signals respectively from encoders E1 and E2, wherein the latter is connected with downstream belt 23 (FIG. 2). The output of counter 19 is connected with a D/A converter 20 which generates an error signal for motor 21 of belt 22 connected with encoder E1. When there are not any products passing, the content of counter 19 is kept to 0, that is the condition for which D/A converter 20 generates a 0 error signal. UP and DW pulses allow belt 22 to rotate in syncrony with downstream belt 23 by means of encoder E2.

Counter 19 receives on parallel loading inputs the content of buffer storage 18 which is the binary numerical expression of the space to be generated between a product 13 and the following one 14.

The loading signal is generated by logic control member 12 when the content of a third counter 24 reaches value 0, which means that product 13 has certainly been transferred onto following belt 23.

Counter 24 has the purpose of avoiding any correction to be done until the preceeding product 13 is certainly on top of downstream belt 23; for such purpose a loading signal for counter 24 is generated by logic control member 12 every time photocell 11 intercepts a light signal coming from the end of the product. The loading takes place with a number which can be set by means of commutators 25 which represent the numerical expression of the desired safety distance before carrying out the correction on the following product. This counter 24 gets decremented by the pulses of encoder E1 until 0 is reached; when the value of 0 is reached, the content of buffer storage 18 is transferred to counter 19 through logic control member 12. A fourth counter 26 has the purpose of limiting the eccessive corrections due to a great distance between a product and the next one, that would just cause an empty place in a row of objects that would otherwise be regular.

Said counter 26 is carried in 27 with a number that can be set by 27 and which is the numerical expression of the maximum distance that has to be recuperated; once this distance is overtaken, the correction does not take place. The backward counting pulses are sent to encoder E1 when the end of the product is out of the photocell. When 0 is reached, the data transfer from buffer storage 18 to counter 19 is blocked inside logic control member 12.

Counter 16 is a device which carries out the algebric addition of the signals that are connected with the inputs. The output of counter 10 is connected to an input, while the digital signals coming from a setting device 17, which represents the desired distance between a product and the other, are connected to the second input. The result of the addition will be an expression of the difference between the space of light detected and the preset distance. Said distance is memorized in the buffer storage 18 when the photocell 11 detects the signal of darkness of the new product arriving.

Referring to the diagram of FIG. 2, an operation schedule obtained by the apparatus object of the invention may be described.

A row of products with variable distances between them is arriving on belt 22. The first product 14 obscures photocell 11. If the distance between the first product 14 and the preceeding one 13 is superior to the preset recuperating distance, counter 26 has reached 0, so belt 22 does not carry on any correction. When product 14 overtakes photocell 11, on the dark/light borderline the logic control member 12 starts generating signals for carrying on the following operations: counter 10 is reset and enabled to count pulses coming from encoder E1; counter 24 is set with the safety distance; counter 26 is set with the maximum distance for recovery. Counter 19 is increased by the addition pulses coming from encoder E2 of downstream belt 23 and is decreased by the pulses coming from encoder E1 of upstream belt 22. The output connected with Digital-/Analogic converter 20 is kept to 0 by the reaction signals from encoders E1 and E2; thus, said belt 22 moves with the same speed as downstream belt 23.

Counter 10 is increased by pulses coming from encoder E1 until a new product 15 arrives; counter 24 is decreased by pulses coming from encoder E1 down to 0, that is when the first product 14 has been transferred onto downstream belt 23; counter 26 is decreased by pulses of encoder E1, but in case 0 has not been reached yet, it will interrupt the correction operation.

Supposed that a new product may obscure the photocell before counter 26 reaches 0, the logic control member on the line of the signal of dark/light photocell 11 memorizes the output datum from counter 10 which is added by counter 16 to the preset datum of the desired distance; the result is memorized in buffer storage 18.

If counter 24 has already reached 0, that is if there is already the safety distance for the correction, it will set counter 19 with the content of memory 18 that represents the distance to be recuperated or lost.

D/A converter 20 generates the error signal which gets the motor 21 of belt 22 to accelerate or slow down so to recuperate or lose the space measured in relation to the product on downstream belt 23 while the required space is recuperated. The pulses coming from the two encoders E1 and E2 progressively cut down to zero the error until synchrony speed is obtained again.

FIG. 3 shows a device similar to the one previously described on which several photoelectric cells 11, one on each belt 22, 23 of the row and an encoder E for each belt. The encoders are connected with each other so that each one of them is a Master "M" relatively to the following one.

By means of this realization it is possible to recuperate gradually shorter distances between the products advancing on the belts, until the preset distance is obtained.

I claim:

1. Apparatus for spacing, near each other at a preset distance therebetween, products (13, 14) which are advancing along conveyor belts (22, 23) with pulse generators (E) applied so as to measure their advancement, and at least a photocell (11) connected with a belt and able to intercept the products while advancing, the products having either a same or different length, said apparatus comprising: first counter means for measuring the empty space between an end of a first product and a leading part of a successive product, said first counter means connected with one of said pulse generators and a photocell (11) fixed on a first conveyor belt (22); second counter means (19) connected with respective pulse generators of said first conveyor belt (22) and a successive belt (23) and further connected with a buffer storage (18) which represents the binary numerical expression of the empty space to be widened or reduced between the end of the first product and the leading part of the successive product, said buffer storage memorizes an output signal from a pulse adder (16) connected to the pulse generator (E1) of said first belt (22), pulses thereof are compared by said pulse adder with a pre-established value of said preset distance, said second counter means (19) having an output connected to a motor (21) by means of a D/A converter (20) which can realize a variation of the speed of the first conveyor belt (22) according to pulses of said second counter means (19) activated by the passage of a product under said photocell such that the space between the end of the first product and the leading part of the successive product is widened or reduced to adjust said empty space to conform to said preset distance; and a logic control member (12) operatively connected with said second counter means (19) and said buffer storage (18).

2. Apparatus according to claim 1 characterized in that it comprises third counter means (24) for receiving a loading signal from said logic control member (12) and which is connected with the second counter means (19) for enabling variations of the speed when a first product (13) has reached said successive belt (23).

3. Apparatus according to claim 2 wherein a commutator (25) represents a numerical expression of a desired safety distance, said commutator is connected with said third counter means (24) and carries on the setting of the third counter means (24).

4. Apparatus according to claim 2 characterized in that it comprises fourth counter means (26) for limiting excessive corrections between two consecutive products, said fourth counter means set by an adjustable number (27) that is the numerical expression of a maximum distance that has to be recuperated; said fourth counter means (26) being connected with the logic control member (12) for interrupting the data transfer from the buffer storage (18) to the second counter means (19) when a preset value is reached.

5. Apparatus according to claim 1 characterized in that a plurality of successive belts are provided with photocells (11) and with pulse generators (E); each one of said pulse generators (E) acting as a Master (M) relative to an upstream pulse generator and as a Slave (S) relative to a downstream pulse generator, so as to progressively recuperate distances initially excessive between two successive products.

6. Apparatus according to claim 1 characterized in that the pulse generators (E1, E2) are encoders.

* * * * *

UNITED STATES PATENT AND TRADEMARK OFFICE
CERTIFICATE OF CORRECTION

PATENT NO. : 5,137,139            Page 1 of 3

DATED : August 11, 1992

INVENTOR(S) : Lorenzo Ruscello

It is certified that error appears in the above-identified patent and that said Letters Patent is hereby corrected as shown below:

In the Abstract, line 7, after "comprises", insert --a--.

In the Abstract, line 8, after "counter" delete "means"; after "the" insert --empty--.

In the Abstract, line 9, delete "said" and insert --the-- therefor.

In the Abstract, line 11, delete ";" and insert --.-- therefor; after the numeral "(22)" insert --A--; after the word "counter" delete "means"; after "(19)" insert --is--.

In the Abstract, line 12, delete "said" and insert --the-- therefor.

In the Abstract, line 13, after "(23)", insert --and further--.

In the Abstract, line 16, after "products", delete "and which" and insert --. The buffer storage-- therefor.

In the Abstract, line 17, delete "the" and insert --an-- therefor.

UNITED STATES PATENT AND TRADEMARK OFFICE
CERTIFICATE OF CORRECTION

PATENT NO. : 5,137,139      Page 2 of 3

DATED : August 11, 1992

INVENTOR(S) : Lorenzo Ruscello

It is certified that error appears in the above-identified patent and that said Letters Patent is hereby corrected as shown below:

In the Abstract, line 18, delete "said" and insert --the-- therefor; after "(22)" delete "and said pulses are".

In the Abstract, line 19, delete "desired" and insert --preset-- therefor.

In the Abstract, line 20, delete "; the" and insert --. An-- therefor; delete "said" and insert --the-- therefor; after the word "the" insert --second--; after the word "counter" delete "means"; delete "being" and insert --is-- therefor.

In the Abstract, line 21, delete "by means of" and insert --via-- therefor.

In the Abstract, line 22, after "realize" delete "or not".

In the Abstract, line 23, delete "said" and insert --the-- therefor.

In the Abstract, line 25, delete "said" and insert --the-- therefor; delete ";" and insert --.-- therefor; delete "a" and insert --A-- therefor; after "(12)" insert --is--.

In the Abstract, line 26, after "(12)" delete "being also provided and".

UNITED STATES PATENT AND TRADEMARK OFFICE
CERTIFICATE OF CORRECTION

PATENT NO. : 5,137,139

DATED : August 11, 1992

INVENTOR(S) : Lorenzo Ruscello

It is certified that error appears in the above-identified patent and that said Letters Patent is hereby corrected as shown below:

In the Abstract, line 27, delete "said" and insert --the-- therefor; after "said" insert --second--; after "counter" delete "means"; delete "said" and insert --the-- therefor.

Signed and Sealed this

Twenty-fifth Day of January, 1994

*Attest:*

BRUCE LEHMAN

*Attesting Officer*  Commissioner of Patents and Trademarks